Oct. 3, 1939.  G. W. SCHUTMAAT  2,174,600
IRRIGATION APPARATUS
Filed Aug. 12, 1937  2 Sheets-Sheet 1

INVENTOR.
George W. Schutmaat
BY Earl T Chappell
ATTORNEYS

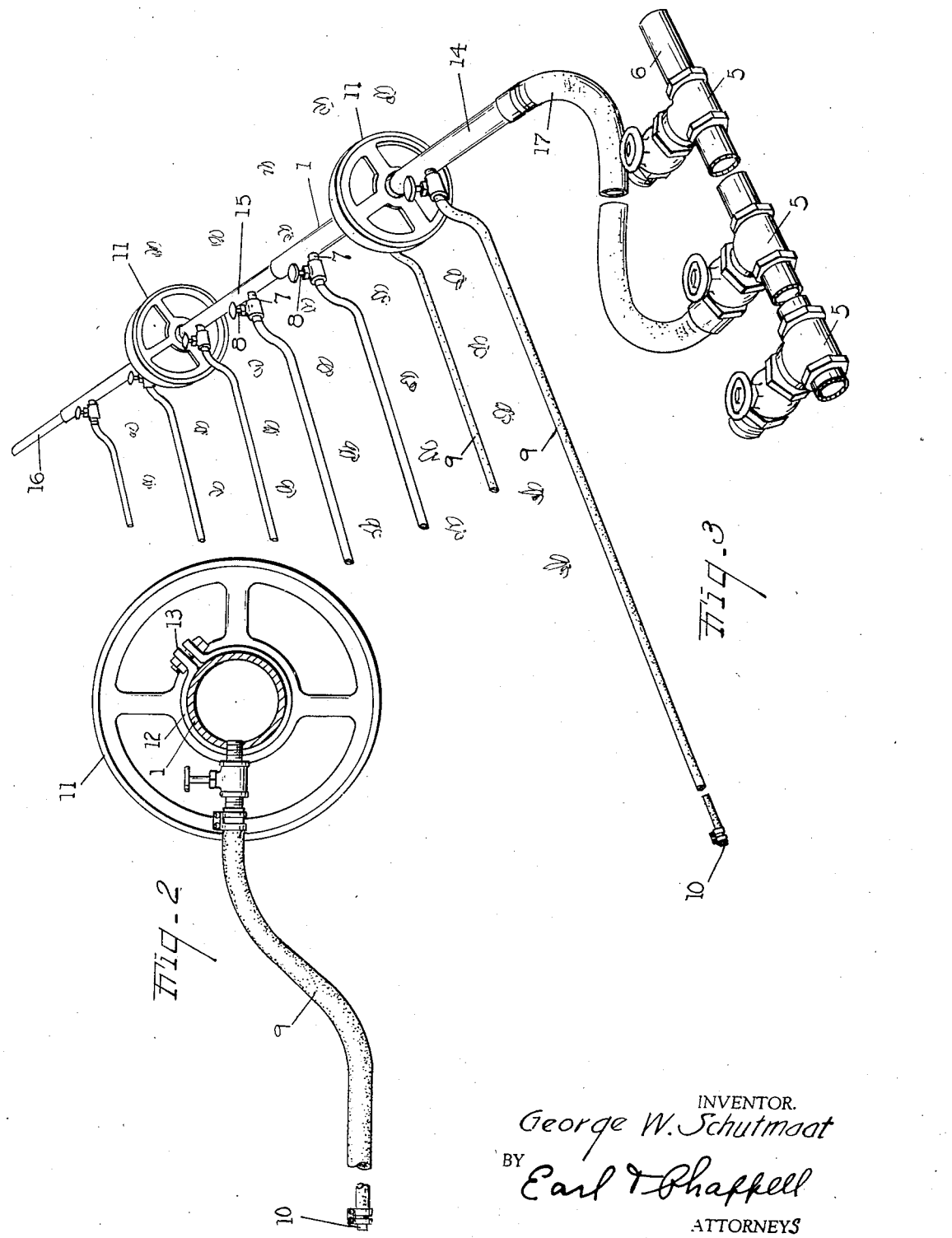

Patented Oct. 3, 1939

2,174,600

UNITED STATES PATENT OFFICE 2,174,600

IRRIGATION APPARATUS

George W. Schutmaat, Hamilton, Mich.

Application August 12, 1937, Serial No. 158,801

2 Claims. (Cl. 61—12)

This invention relates to improvements in irrigation apparatus.

The main objects of my invention are:

First, to provide a novel and improved apparatus for agricultural irrigation purposes which is capable of being moved as desired over a large area to be irrigated.

Second, to provide a novel and improved apparatus of the type described characterized by simplified features whereby highly effective irrigation is accomplished throughout a predetermined area.

Third, to provide an irrigation apparatus of the type described having translatable means associated therewith and means whereby the apparatus may be selectively hooked up at a plurality of points to a source of water supply.

Fourth, to provide an improved fluid distributing element for an irrigation apparatus to secure uniform distribution of fluid.

Further objects relating to details and economies of my invention will definitely appear from the description to follow. The invention is defined in the claims.

Preferred embodiments of my invention are illustrated in the drawings, in which:

Fig. 2 is an enlarged view in transverse section illustrating details of my invention.

Fig. 3 is a view similar to Fig. 1 illustrating a modified form of my invention.

Figure 1:
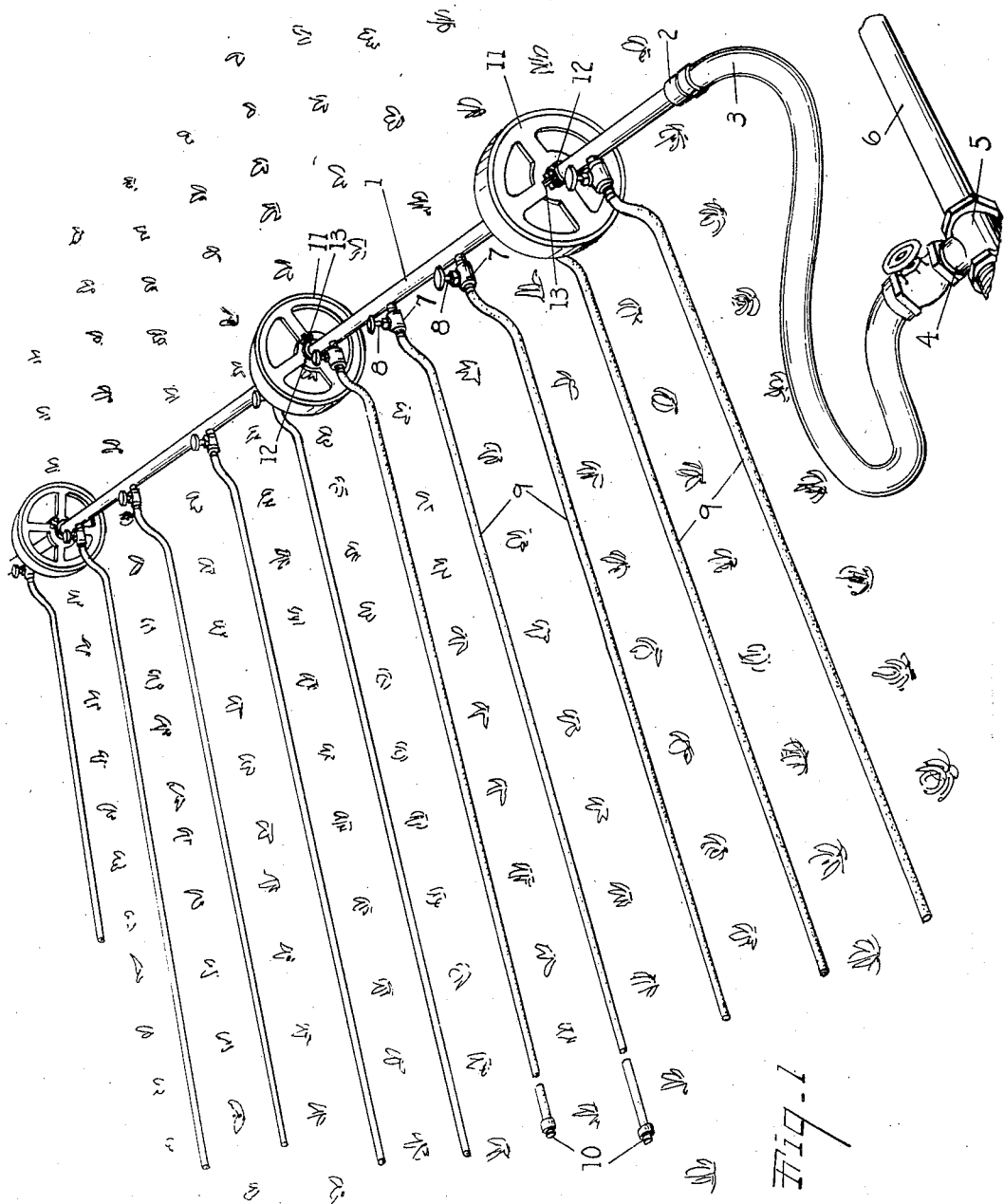
Fig. 1 is a perspective view illustrating the apparatus of my invention in operative relation to an area to be irrigated.

Referring to the drawings, the reference numeral 1 indicates an elongated header or feeder pipe having its ends 2 formed for ready attachment to and detachment from a flexible hose connection 3 which connection is in turn adapted for ready connection at 4 to one of a plurality of T-fittings in a source of water supply main 6. Header pipe 1 has tapped therein at a plurality of points along its length outlets 7 each provided with a valve 8 whereby the outlet may be opened or closed as desired. To each of the outlets, I attach an elongated hollow fluid distributing hose section 9 of fabric or other material which is permeable and penetrable by water. Any porous member which can be fed from a source and is radially and axially fluid penetrable will serve for this purpose. I employ a grade of canvas or canvas-like fabric. The free end of each of the sections is closed by a plug 10 clamped therein or is otherwise shut off.

In order to create substantially uniform fluid pressure in the hose sections 9 throughout the length thereof whereby substantially uniform discharge of water will occur lengthwise therethrough, I preferably taper the said hose sections from their point of connection with outlets 7 to the closed free ends of the same. Not only does this provision result in more uniform distribution as stated, but it also reduces the weight or volume of water which the hose section contains and decreases the weight of the apparatus as a whole and the power that is necessary for moving the same over a field.

For the purpose of translating header pipe 1 transversely of the length thereof, I provide a plurality of wheels 11 at spaced points therealong, the wheels being suitably rotatably journaled on pipe 1 and restrained against axial movement by collars 12 surrounding pipe (see Fig. 2) and clamped in that position through ears 13 on the collars.

By the foregoing provisions, the manner in which my device finds application is apparent. The header pipe may be translated by means of wheels 11 to any desired point lengthwise of rows of plants and as many of the valves 8 opened as is desired and to the extent desired. Pipe connection 3 is of a length sufficient to enable the device to irrigate all of the land between adjacent fittings 5 in the main 6 and may be selectively joined to any thereof. After a certain section of land is sufficiently irrigated, the device is moved along to a succeeding section and the operation repeated. If desired, the pipe 1 may be reversed relative to flexible connection 3 and the device progressed in the opposite direction, or alternatively, the porous sections may be disposed on the opposite side of header pipe 1 by rotating the same 180°.

In Fig. 3, I disclose a modified form of my invention wherein header pipe 1 consists of a plurality of axially alined and connected pipe sections 14, 15, 16, the diameter of the sections decreasing successively in a direction away from flexible connection 17. By the foregoing provisions, namely, the decrease of header section lengthwise of header pipe 1, the pressure at the various outlets 7 and delivery of water to the several distributing hose sections are maintained. The individual regulating valves 8 are, however, very effective for the purpose and may be adjusted to deliver flushing pressure to any particular distributing hose.

The modification of Fig. 3 also embodies longitudinally tapered hose sections or distributing elements 9 as described above, as illustrated in Figs. 2 and 3.

The advantages of my construction are obvious. A large area may be irrigated as desired, the porous nature of sections 9 permitting a uniform flow of water over the area simultaneously in all directions and at all points. The slow delivery of the water through the flexible porous delivery hose permits the water to sink into and be uniformly absorbed by the soil and is much superior to sprinkling distribution. This method of distribution of the water is very uniform and does not ordinarily result in crusting. The operating parts are simple in nature and not likely to fail or become clogged in use, and even if replacements are necessary, they can be made inexpensively by unskilled persons.

I have illustrated and described my improvements in embodiments which I consider very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In an irrigation apparatus, the combination of a tapered header pipe, means for supporting said header pipe for translation over a surface to be irrigated, a plurality of uniformly spaced outlets for said header pipe, and a plurality of flexible hose sections of porous fabric, each attached at one end to an outlet of said header pipe and having the other end closed.

2. In an irrigating apparatus, a source of water supply having a plurality of spaced T-fittings, a flexible hose connection adapted for selective connection with said fittings, a header pipe connected at one end to said hose connection and decreasing in diameter from said end, a plurality of wheels rotatably associated with said header pipe whereby the same may be translated transversely of its length, a plurality of spaced valved outlets on one side of said header pipe, and flexible water permeable hose lengths connected to said outlets, said hose lengths being closed at their free ends and longitudinally tapered to said free ends whereby discharge of fluid throughout the hose lengths is substantially uniform.

GEORGE W. SCHUTMAAT.